US007321587B2

(12) United States Patent
Gao et al.

(10) Patent No.: US 7,321,587 B2
(45) Date of Patent: Jan. 22, 2008

(54) HANDOVER RESOURCE OPTIMIZATION

(75) Inventors: Xia Gao, San Jose, CA (US); Moo R. Jeong, San Jose, CA (US); Fujio Watanabe, Sunnyvale, CA (US); Gang Wu, Cupertino, CA (US)

(73) Assignee: NTT Docomo, Inc., Tokyo (JP)

( * ) Notice: Subject to any disclaimer, the term of this patent is extended or adjusted under 35 U.S.C. 154(b) by 1030 days.

(21) Appl. No.: 10/295,800

(22) Filed: Nov. 15, 2002

(65) Prior Publication Data

US 2004/0095912 A1 May 20, 2004

(51) Int. Cl.
*H04Q 7/24* (2006.01)

(52) U.S. Cl. .................... 370/388; 370/468
(58) Field of Classification Search ............. 370/388, 370/401, 389, 468, 395.1, 332, 346, 395.2, 370/395.52; 455/388, 401, 389, 468, 395.1, 455/332, 346, 395.2, 395.52
See application file for complete search history.

(56) References Cited

U.S. PATENT DOCUMENTS

| 2003/0053453 | A1* | 3/2003 | Ono et al. ............... 370/389 |
| 2004/0165594 | A1* | 8/2004 | Faccin et al. ............ 370/395.2 |
| 2004/0228304 | A1* | 11/2004 | Riedel et al. ............. 370/332 |
| 2006/0083238 | A1* | 4/2006 | Lee et al. ............... 370/389 |

OTHER PUBLICATIONS

Andrew T. Campbell, Javier Gomez, Sanghyo Kim, Andras G. Valko, and Chieh-Yih Wan, "Design, Implementation, and Evaluation of Cellular IP," *IEEE Personal Communications*, Aug. 2000.

Ramachandran Ramjee, Thomas F. La Porta, Luca Salgrelli, Sandra Thuel and Kannan Varadhan, "IP-Based Access Network Infrastructure for Next-Generation Wireless Data Networks," *IEEE Personal Communications*, Aug. 2000.
Cisco Systems, "Quality of Service Networking," *Internetworking Technologies Handbook*, Indianapolis, Indiana 1999.
C. Perkins, "IP Mobility Support," *Network Working Group Standards Track*, Oct. 1996.
A. Terzis, J. Krawczyk, Wroclawski and L. Zhang, "RSVP Operation Over IP Tunnels," *Internet RFC/STD/FYIBCP Archives*, Jan. 2000.
Hemant Chaska, "Requirements of a QoS Solution for Mobile IP," *IETF Mobile IP Working Group*, Jul. 2002.

* cited by examiner

*Primary Examiner*—Naghmeh Mehrpour
(74) *Attorney, Agent, or Firm*—Blakely, Sokoloff, Taylor & Zafman LLP

(57) ABSTRACT

A method for maintaining a quality of service in a wireless communication network is introduced. A reservation is created in a first data path between a home agent and a first foreign agent for data flow between the home agent and a wireless terminal. When the wireless terminal associates with a second foreign agent, a quality of service supportive second data path may be created between the first foreign agent and the second foreign agent. The data flow may be routed over the first and second data paths to maintain the quality of service for the data flow. A wireless communication network may include first downstream and reverse tunnels coupling a home agent and a first foreign agent, each tunnel having a reservation to maintain a quality of service. Second downstream and reverse tunnels may couple a home agent and a second foreign agent. All or part of the resources reserved by the first tunnels may be shared with the second tunnels when a wireless terminal hands over from the first foreign agent to the second foreign agent.

37 Claims, 10 Drawing Sheets

HANDOVER RESOURCE OPTIMIZATION

FIELD OF THE INVENTION

The present invention relates generally to resource reservation in data networks and more particularly, to optimizing resource utilization during a handover.

BACKGROUND OF THE INVENTION

Recent years have witnessed explosive growth of mobile computing and rapid emergence of new wireless technologies. The key to the success of the next generation of mobile communication systems is providing the user with seamless services at any time, in any place, and in any way. To create a seamless experience, one requirement is providing Quality of Service (QoS) in handovers caused by user mobility and the user's or provider's preferences. Traditionally, there are two types of handovers, horizontal handovers and vertical handovers. As used herein, a horizontal handover is defined as a handover between base stations of the same administrative domain that use the same type of wireless network interface. As used herein, a vertical handover is a handover between base stations that are either in different administrative domains or that use different types of wireless network interfaces. A hyper handover is defined more broadly than a vertical handover. A hyper handover includes not only handovers of a terminal between different administrative domains or types of wireless network interfaces, but also handovers between different terminals and different applications.

Internet Protocol (IP) Mobility Support ("Mobile IP") as described in IETF RFC 2002 is the current standard for supporting mobility in an IP network. Mobile IP defines two entities for providing mobility support: a home agent and a foreign agent. The packets destined for a wireless terminal are intercepted by the home agent, encapsulated, and tunneled to the foreign agent. The foreign agent decapsulates the packets and forwards them directly to the wireless terminal. Mobile IP provides a framework for allowing users of wireless terminals to roam outside of their home networks without disruption.

Mobile IP, however, was not designed for use in wide-area wireless networks, or to manage mobility between adjacent base stations in the same administrative domain ("micro-mobility"). Mobile IP treats all forms of mobility uniformly, so a user moving a short distance, perhaps between two adjacent base stations in the same administrative domain, can experience significant disruptions, such as loss and delay, due to the frequent registration to the remote home agent. Mobile IP produces a new care-of address on every handover from one base station to another. This introduces complexity and delay for the new QoS reservation or path setup. Additionally, mobile IP provides no support for QoS.

Protocols such as Cellular IP, Hawaii and others have been created for micro-mobility. These protocols try to limit the global updates caused by local movement by either introducing hierarchical foreign agents or smart foreign agents, depending on the network topology. All of these protocols, however, assume a homogeneous network and a common administrative domain. These protocols target horizontal handover problems. For a vertical handover, these protocols usually will not work, because there is usually no one common agent above two separate administrative domains.

There are several frameworks that support QoS, such as integrated service ("Inte-Serv"), differentiated services ("Diff-Serv"), and multi-protocol label switching ("MPLS"). The focus here is on the Inte-Serv framework, which gives the best QoS guarantee once a reservation is built up.

Resource reservation protocol ("RSVP") is the current standard for supporting Inte-Serv in IP networks. It is well understood that in order to provide guaranteed service some kind of reservation or admission control is needed at the edge router no matter what kind of QoS mechanism is used in the core network. RSVP and extensions thereof are used by a host to request a specific QoS from the network for particular application data flows. It is also used by routers to deliver QoS requests to all nodes along the path of the data flows and to establish and maintain the requested services. RSVP works closely with other components in the Inte-Serv framework including flow specification, routing, admission control, policy control and packet scheduling. RSVP supports both unicast and multicast data flows. RSVP is a receiver-initiated reservation protocol to facilitate the accommodation of heterogeneous receivers and multicast group membership changes. RSVP provides different reservation styles to improve the usage of the bandwidth and allow the multiplexing of different senders in the same multicast group. RSVP uses "soft states" in intermediate routers that automatically expire after some time interval to deal gracefully with route changes or failures.

RSVP does not account for mobility in its receiver-initiating algorithm. Therefore, other protocols that are extensions of the RSVP protocol were created to support mobility, such as Mobile RSVP (MRSVP). These protocols are based on proactively setting up a resource reservation in other base stations where the application is likely to travel. Such proactive reservations, however, could lead to bandwidth waste and large numbers of control messages to refresh the RSVP soft states.

Another extension supports RSVP over an IP-IP tunnel. In Mobile IP without route optimization, communication between a wireless terminal and a corresponding terminal is through an IP-IP tunnel between a home agent and a foreign agent. Hence, an end-to-end RSVP session between the wireless terminal and the corresponding terminal needs to be mapped and supported by the tunneled RSVP session between the home agent and the foreign agent. When the wireless terminal moves from one foreign agent to another foreign agent, current IP-IP tunnel schemes set up a new tunnel RSVP session between the home agent and the new foreign agent. The old and new tunnel RSVP sessions have no knowledge of each other, which leads to double booking of resources on common routers of the two tunnels.

It would be desirable to provide a QoS method for mobility that minimizes the interruption in QoS at the time of a handover. It would also be desirable to provide a QoS method for mobility that localizes the QoS reestablishment to affected parts of a data flow path in a network, and releases the QoS state in an old data flow path (if any) after a handover. It further would be desirable to provide a QoS method for mobility that does not rely on a proactive reservation, to thereby reduce resource overuse. It would also be desirable to provide a QoS method for mobility that is general enough for use in a hyper handover.

SUMMARY OF THE INVENTION

A method is provided for maintaining a quality of service in a wireless communication network. A reservation is created in a first data path between a home agent and a first foreign agent for data flow between the home agent and a wireless terminal. The wireless terminal is associated with a second foreign agent, and a quality of service supportive second data path is created between the first foreign agent and the second foreign agent. The data flow is routed over the first and second data paths to maintain the quality of service for the data flow.

The wireless terminal may be disassociated from the first foreign agent to be associated with the second foreign agent. A reservation may be created in a third data path between the home agent and the second foreign agent to maintain the quality of service for the data flow. Alternatively, a reservation may be created in a fourth data path between the home agent and a corresponding terminal and the data flow may traverse the first, second, and fourth data paths, and terminate at the corresponding terminal and the wireless terminal. A tunnel may be created in the first data path includes, and the reservation may be created for the tunnel.

A wireless communication network is provided that includes a home agent communicatively coupled to a corresponding terminal and a foreign agent communicatively coupled to a wireless terminal. The wireless communication network also includes a first data flow originating at the corresponding terminal and terminating at the wireless terminal and a second data flow originating at the wireless terminal and terminating at the corresponding terminal. A downstream tunnel couples to the home agent and the foreign agent. The downstream tunnel reserves resources to carry the first data flow from the home agent to the foreign agent at a first quality of service. A reverse tunnel couples the home agent and the foreign agent. The reverse tunnel reserves resources to carry the second data flow from the foreign agent to the home agent at a second quality of service.

A method is provided for maintaining a quality of service in a wireless communication network. A first reservation is created in a first data path between a home agent and a first foreign agent, where the first data path includes a first segment between a router and the home agent and a second segment between the router and the first foreign agent. A second reservation is created in a second data path between a home agent and a second foreign agent, where the second data path includes a first segment between the router and the home agent and a second segment between the router and the second foreign agent. The second reservation is used for the first segment of the first data path.

A reservation message using the shared explicit style that includes addresses of the first and second foreign agents in a senders list may be sent from the home agent to the router. A reservation message including a first session object associated with the first data path and a second session object associated with the second data path may be sent from the home agent to the router path. The second session object may be substituted for the first session object in a memory of the router.

The first data path may consist essentially of a reverse tunnel for carrying data from the first foreign agent to the home agent. The second data path may consist essentially of a reverse tunnel for carrying data from the second foreign agent to the home agent.

Data may be transmitted from a wireless terminal through the first or second foreign agent to the home agent. The wireless terminal may be associated with the first or the second foreign agent. The wireless terminal may be disassociated from the first foreign agent after it is associated with the second foreign agent.

A method is provided for maintaining a quality of service in a wireless communication network. A first reservation is created in a first data path between a home agent and a router using a first session object, and in a second data path between the router and a first foreign agent using the first session object. A second reservation is created in a third data path between the router and a second foreign agent using the first session object and a second session object, and in the first data path using the first and the second session objects. Resources in the first data path are reserved by the first and the second reservation.

A reservation request message including the first and the second session objects may be sent from the second foreign agent through the router to the home agent.

Information from the second session object may be stored in a memory of the router. The first session object may be replaced by the information from the second session object when the router receives a path tear-down message including the first session object. The first and second data paths may form a forward tunnel for carrying data from the home agent to the first foreign agent. The first and third data paths may form a forward tunnel for carrying data from the home agent to the second foreign agent. Data may be transmitted from the home agent through the first foreign agent to a wireless terminal, and from the home agent through the second foreign agent to the wireless terminal.

DETAILED DESCRIPTION OF THE PRESENTLY PREFERRED EMBODIMENTS

The present invention provides a method for optimizing resource use while maintaining a QoS. First, embodiments supporting a vertical handover are described to discuss various aspects of the method in detail. Then, alternative embodiments are described that show how the method can be applied in other scenarios, such as a hyper handover scenario.

Figure 1:
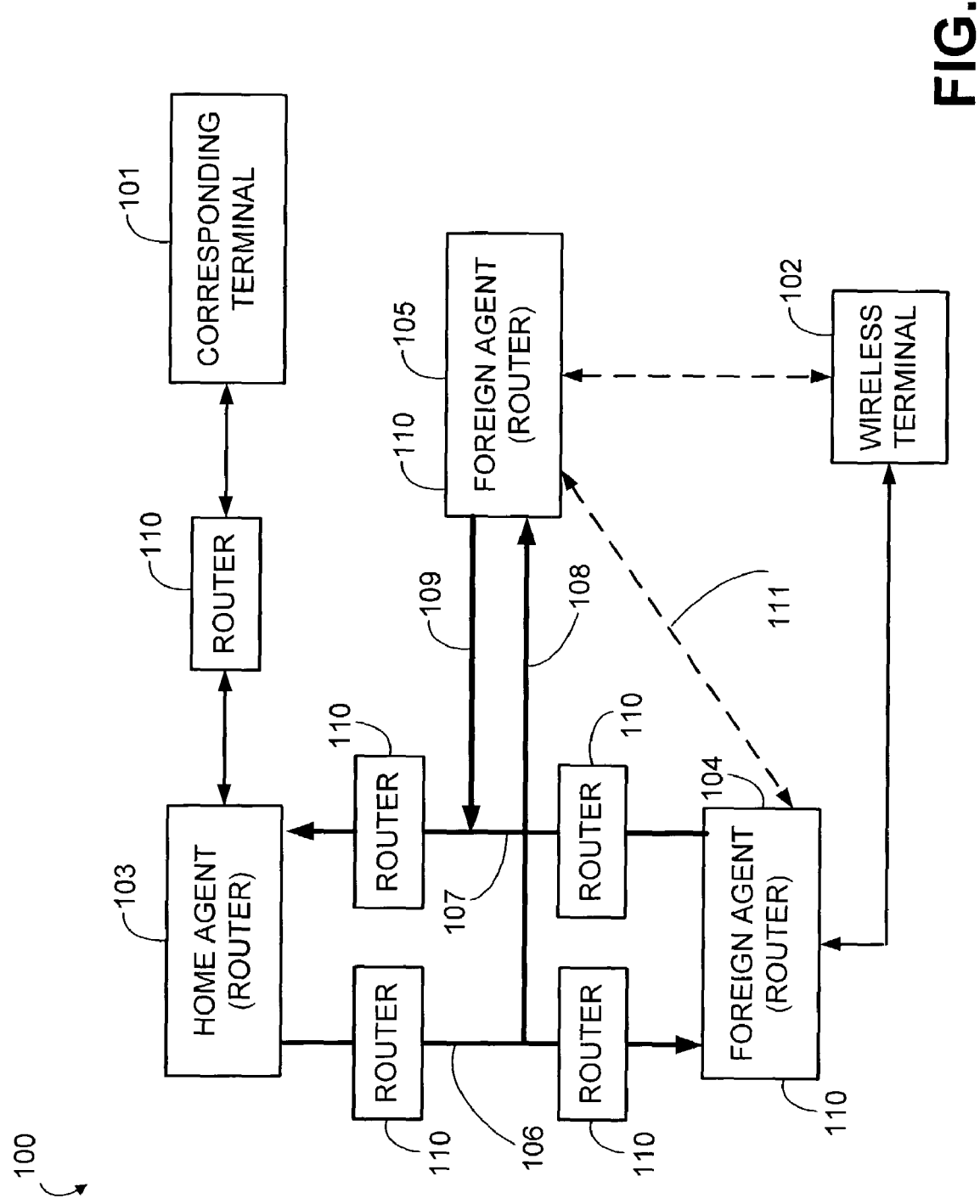
FIG. 1 is a system level block diagram of a data network.

FIG. 1 is a system level block diagram of a data network 100. The data network 100 may be any computing environment where one or more terminals communicate with one or more other terminals. The configuration of the data network 100 shown in FIG. 1 is merely illustrative. The data network 100 includes: one or more wireless terminals 102, one or more corresponding terminals 101, a first foreign agent 104, a second foreign agent 105, a home agent 103, and at least one router 110.

The wireless terminal 102 may communicate with the corresponding terminal 101 via the network 100. The network 100 may be a global network, such as the Internet, a wide area networks (WAN), or a local area network (LAN). The network 100 may include wireless communication networks, local area networks (LAN), wide area networks (WAN), satellite networks, Bluetooth networks, or other types of networks. Even though elements of the network 100 are shown as directly coupled in FIG. 1, the elements may be indirectly coupled and separated geographically. The simplified coupling is shown in order to more clearly illustrate communication paths.

The wireless terminal 102 and the corresponding terminal 101 may each be a desktop computer, a server, a laptop computer, a personal digital assistant (PDA), a pocket PC, a wireless telephone, or some other communications enabled device. The terminals 101 and 102 may each be both a sender and a receiver. The terminals 101 and 102 may each be configured as a client, as a server, or as a peer for peer-to-peer communications. Peer-to-peer communications may include voice over IP (VoIP), video teleconferencing, text messaging, file sharing, video streaming, audio streaming, or other direct communications. The terminals 101 and 102 may be capable of wireless communications, and may be coupled to the network 100 physically or through a wireless interface. The wireless terminal 102 and the corresponding terminal 101 may each have a memory including instructions for operation.

The wireless terminal 102 may be capable of changing its point of attachment to network 100 from one network or sub-network to another. For example, the wireless terminal 102 may change its point of attachment (handover) from the home agent 103 to the first foreign agent 104. The wireless terminal 102 may change its location without changing its home address so that it may continue to communicate after a handover.

The home agent 103 may be a router on the wireless terminal 102's home network. The home agent 103 may maintain current location information for the wireless terminal 102, and tunnel datagrams or packets for delivery to the wireless terminal 102 when it is attached to a foreign network.

A tunnel is a method of routing datagrams or packets through portions of a network to augment or modify the behavior of the deployed routing architecture. Here, a tunnel is used to implement Mobile IP. The home agent 103 is a tunnel entry point where the datagrams or packets are encapsulated with an additional header, such as an additional IP or UDP header, which indicates a tunnel exit point. From the perspective of traditional best-effort IP packet delivery, a tunnel behaves as any other link. Packets enter one end of the tunnel, and are delivered to the other end unless resource overload or error causes them to be lost.

The foreign agents 104 and 105 may be routers on foreign networks to which the wireless terminal 102 may attach. The foreign agents 104 and 105 may provide routing services to the wireless terminal 102. The foreign agents 104 and 105 may be tunnel exit points that detunnel (decapsulate) datagrams or packets that have been tunneled by the home agent 103. The foreign agents 104 and 105 may deliver the detunneled datagrams or packets to the wireless terminal 102, and may serve as a default router for datagrams or packets sent by the wireless terminal 102.

The wireless terminal 102 may have a home address on the home network associated with the home agent 103. The home address may endure irrespective of the wireless terminal 102's point of attachment to the network 100. When the wireless terminal 102 attaches to the network 100 via the first foreign agent 104, it may be associated with a care-of address that provides information about its current point of attachment. The care-of address may be registered with the home agent 103. The home agent 103 may intercept packets destined for the wireless terminal 102 and route them to the wireless terminal 102 via a tunnel to the first foreign agent 104.

The routers 110 may route packets. Each router 110 may be capable of determining a next network node to which a received packet should be forwarded, and forwarding it to that node. A network node may be a terminal, a gateway, a bridge, or another router. The placement of routers 110 in FIG. 1 is merely illustrative, and more or fewer routers 110 may be included in network 100.

Resource Reservation Protocol Generally

Figure 2:
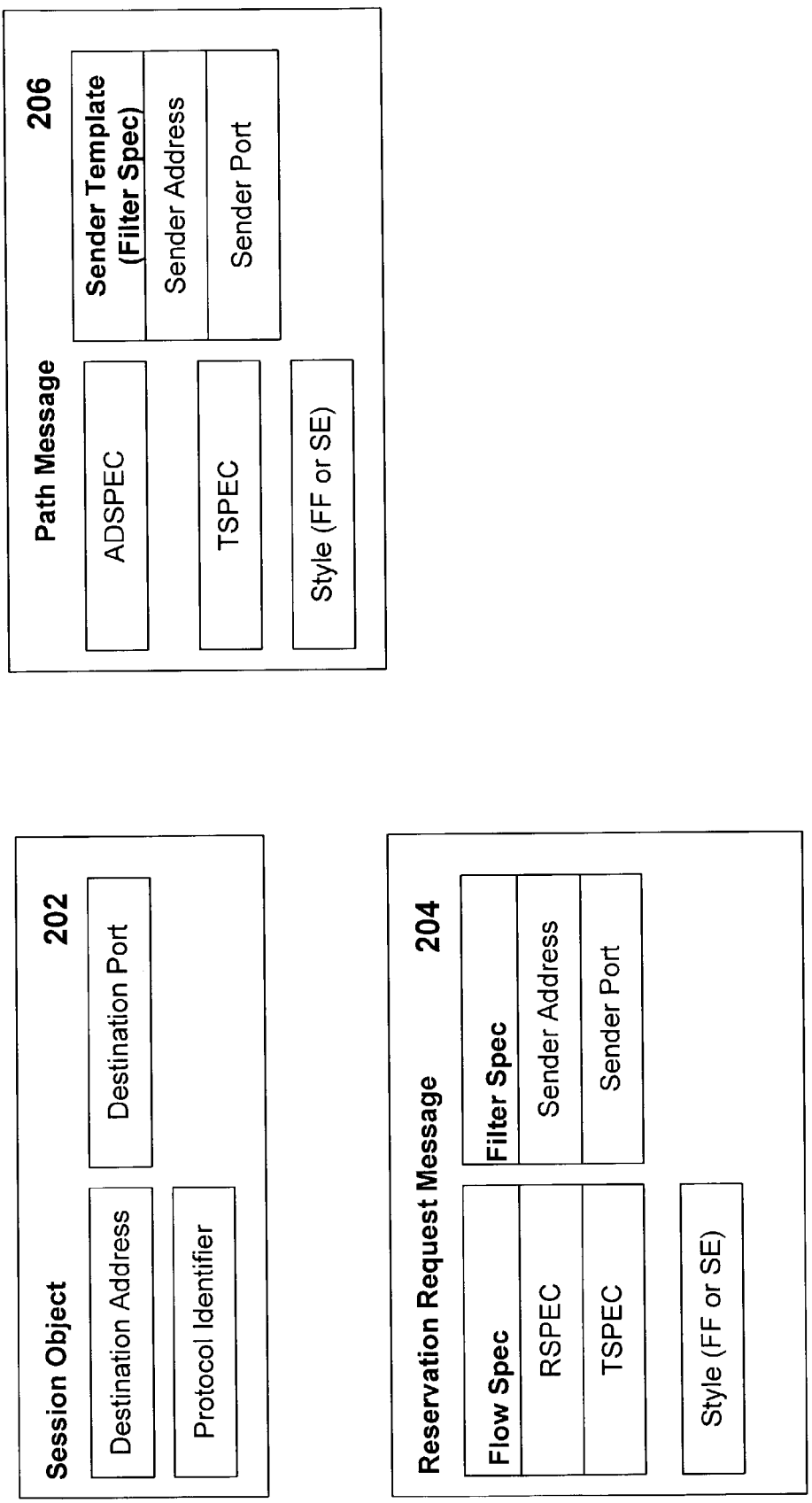
FIG. 2 is a block diagram of messages and objects used in a resource reservation protocol.

Referring collectively to FIGS. 1 and 2, a resource reservation protocol is described. The resource reservation protocol may be used by a receiver that receives information from a sender. The resource reservation protocol may be used by the receiver to request a QoS for data flows of an application running thereon. The receiver may be the corresponding terminal 101, the wireless terminal 102, the home agent 103, and the foreign agents 104 and 105. The sender may also be the corresponding terminal 101, the wireless terminal 102, the home agent 103, and the foreign agents 104 and 105. If successful, the resource reservation protocol may allocate sufficient resources between the receiver and a sender to establish and maintain the requested QoS.

The resulting allocation of resources for a data flow is defined herein as a reservation. For each data flow, there is a unique session object 202. Every message, datagram or packet includes a session object 202 that identifies its data flow. The session object 202 contains a destination address, a protocol identifier and a destination port number.

The resource reservation protocol may be used to establish a reservation. The resource reservation protocol may include a reservation request message (RESV) 204, a path message (PATH) 206, a tear down message, an acknowledgment message, and error messages. The reservation request message 204 preferentially includes a flowspec object, a filter spec object, and a style object. A flowspec object consists of two sets of numeric parameters. The first numeric parameter is an RSPEC that defines the desired level of QoS that is being requested. The second numeric parameter is a TSPEC that describes the traffic characteristic of the data flow.

The filter spec object includes at least the sender address and the sender port number. The filter spec object defines a set of data packets to receive the QoS defined by the flowspec. The flowspec object is used to set parameters in packet scheduler modules of the routers 110, while the filter spec object is used to set parameters in packet classifier modules of the routers 110.

The style object is a two-dimensional value indicating how to treat reservations for different senders within the same session, and how to select senders. A session may have either a distinct reservation for each upstream sender, or one shared reservation for a group of selected senders. The selection of senders may be an explicit list of senders in a session. The two styles discussed herein are a Fixed-Filter (FF) style and a Shared Explicit (SE) style. In FF style, a reservation request message creates a distinct reservation for data packets from a particular sender, not sharing the reservation with other senders' packets for the same session. In the SE style, a reservation request message creates a single reservation shared by selected senders of the same session.

A path message 206 includes a sender template, a sender TSPEC, an ADSPEC, and a style object. A sender template is in the form of a filter spec. The sender TSPEC describes the traffic characteristic of the data flow, as in a reservation request message. The ADSPEC is a package of "one pass with advertising" (OPWA) information, which is information that the receiver can use to predict end-to-end a QoS level. The ADSPEC in a path message is processed in a router 110 by the traffic control modules, which update the ADSPEC message. The updated ADSPEC message is then included in the path message 206 forwarded by a router 110.

A teardown message removes the path and reservation state from all routers 110 downstream from the point of initiation. Reservation request acknowledgment messages are sent as the result of the appearance of a reservation confirmation object in a reservation request message. Error messages include path-error messages and reservation request error messages. Path error messages result from path errors and are routed hop by hop towards the receiver. Reservation request error messages result from failed reservation request messages and travel toward the receiver that sent the reservation request message.

In operation, a receiver node generates and transmits a reservation request message 204 upstream toward a sender node. The reservation request messages 204 create a reservation state in each router 110 along the data path. The reservation messages 204 are then delivered to the sender node so that the receiver node can set up appropriate traffic control parameters for the first hop along the data path.

Each sender node generates and transmits path messages 206 downstream along a unicast or multi-cast data path. The path messages are forwarded from one router 110 (or a foreign agent 104 or 105, or home agent 103) to the next in the path. The path messages 206 store a path state in each router 110 along the data path. The path state includes at least the unicast address of the previous hop node or router 110, which is used to route the reservation messages 204 hop-by-hop in the reverse direction, toward the initiating receiver node.

Referring to FIG. 1, an illustrative example using the resource reservation protocol to create a reservation is described. The corresponding terminal 101 is communicating with the wireless terminal 102 through the home agent 103 and the foreign agent 104. The wireless terminal 102 is both a sender and a receiver. Although only one corresponding terminal 101 is shown, multiple corresponding terminals may be in communication with the wireless terminal 102.

There are two tunnels between the home agent 103 and foreign agent 104. When the wireless terminal 102 is the receiver, the downstream tunnel 106 communicates datagrams or packets from home agent 103 to the foreign agent 104. When the wireless terminal 102 is the sender, the reverse tunnel 107 communicates datagrams or packets from foreign agent 104 to the home agent 103.

When the wireless terminal 102 hands over to the second foreign agent 105, a new downstream tunnel 108 new reverse tunnel 109 are established. To accommodate both unicast and multicast scenarios, and to decrease the overhead of reconstructing the multicast tree, the reverse tunnel 109 is used when the wireless terminal 102 is the sender, rather than route optimization.

An end-to-end reservation exists between the wireless terminal 102 and the corresponding terminal 101. To facilitate reservation creation, the end-to-end reservation between the corresponding terminal 101 and the wireless terminal 102 is implemented in two segments. The first segment is between the corresponding terminal 101 and the home agent 103. The second segment is between the home agent 103 and the foreign agent 104.

The end-to-end resource request messages 204 and path messages 206 are encapsulated as ordinary packets and tunneled transparently. The tunnels 106, 107, 108, and 109 each behaves as a single link from the end-to-end perspective. For each tunnel 106, 107, 108, and 109, a reservation may exist between the home agent 103 and the respective foreign agent 104 or 105. For the downstream tunnels 106 and 108, the home agent 103 may map between the end-to-end reservation and each downstream tunnel reservation. For the reverse tunnels 107 and 109, the respective foreign agent 104 or 105 may provide similar mapping.

The end-to-end reservation is specified by a five-tuple: the source and destination addresses, the source and destination ports, and the protocol type. The reservations in the tunnels 106, 107, 108, and 109 are specified using the address and port information of the home agent 103 and the foreign agents 104 or 105. If multiple data flows exist between home agent 103 and the foreign agents 104 and 105, different flows may use unique source port numbers to reserve resources for the tunnels 106, 107, 108, and 109. The unique source port numbers facilitate distinguishing the reservations for these data flows.

The mapping of the end-to-end five-tuples to the respective source port may be stored by either the home agent 103 or the respective foreign agent 104 or 105. This mapping requires two levels of encapsulation, which may be IP-UDP-IP encapsulation. First, IP packets from the wireless terminal 102 and the corresponding terminal 101 are encapsulated using a UDP header that has a specific source port according to the mapping. Then, the UDP packet is encapsulated with an IP header, so that the encapsulated packets may receive the specified QoS in the tunnel.

Resource Sharing where Wireless Terminal is Sender

During an illustrative handover of the wireless terminal 102 from the old foreign agent 104 to the new foreign agent 105, resources may be shared between reverse tunnels 107 and 109, where the wireless terminal 102 is a sender. A QoS supportive path 111 may exist between the first foreign agent 104 and the second foreign agent 105. The QoS supportive path 111 may facilitate the use of the downstream tunnel 106 and the reverse tunnel 107 for end-to-end communications between the wireless terminal 102 and the corresponding terminal 101 to achieve the specified QoS until the reservation on the downstream tunnel 108 and the reverse tunnel 109 are operational. The QoS supportive path 111 between the first foreign agent 104 and the second foreign agent 105 can be set up in different ways. It can use pre-configured QoS support path or can be dynamically set up after the wireless terminal 102 has associated with the second foreign agent 105.

The data path between the corresponding terminal 101 and the home agent 103 does not change after the handover, so that the reservation may remain unchanged. The tunnels associated with the home agent 103, however, change from tunnels 106 and 107 to tunnels 109.

Traditional tunnel reservations reserve resources along each respective tunnel using the FF Style. In a tunnel reservation, the three-tuple (destination IP address, destination port and protocol type) in the session object 202 may be used to express the session and the reservation. The two-tuple (source IP address and source port) in the sender template and filter spec objects may be used to filter input packets and determine which senders may use the reservation. Traditional tunnel reservations may lack mobility support, because the FF style does not allow resource sharing among different senders in the same session. Therefore, a distinct reservation has to be created for each sender in the session.

To enable the sharing of resources in a tunnel reservation, the preferred embodiment of the present inventions uses the Shared Explicit (SE) style for tunnel reservations in the reverse tunnels 107 and 109 from the foreign agents 104 and 105 to the home agent 103. The SE style is preferred for the following reasons. First, the three-tuple of the session object 202 is the same during the handover where the wireless terminal 102 is the sender. Because the home agent 103 is the receiver, the session expression may be kept constant by using the IP address, port number and protocol type (UDP here) of the home agent 103. In this manner, the reservation may be uniquely specified in each intermediate router 110.

Second, packets are not communicated from the wireless terminal 102 via both reverse tunnels 107 and 109 simultaneously. Packets are communicated via the old tunnel 107 before the new reservation succeeds, and via the new tunnel 109 thereafter. This facilitates resource sharing along the reverse tunnels 107 and 109. Furthermore, the foreign agents 104 and 105 may be completely multiplexed to one unit of reservation, thereby avoiding resource waste. Third, the wireless terminal 102 may use a different care-of address for the sender address to make the resource reservation during the handover. Therefore, resource sharing may be achieved transparently without modification of intermediate routers 110.

To further distinguish the reverse tunnels 107 and 109 for different wireless terminals 102, the home agent 103 may use different destination port numbers to map the end-to-end reservations. When the wireless terminal 102 moves to the new foreign agent 105, it must make the reservation to the same destination port of the home agent 103.

Figure 3:
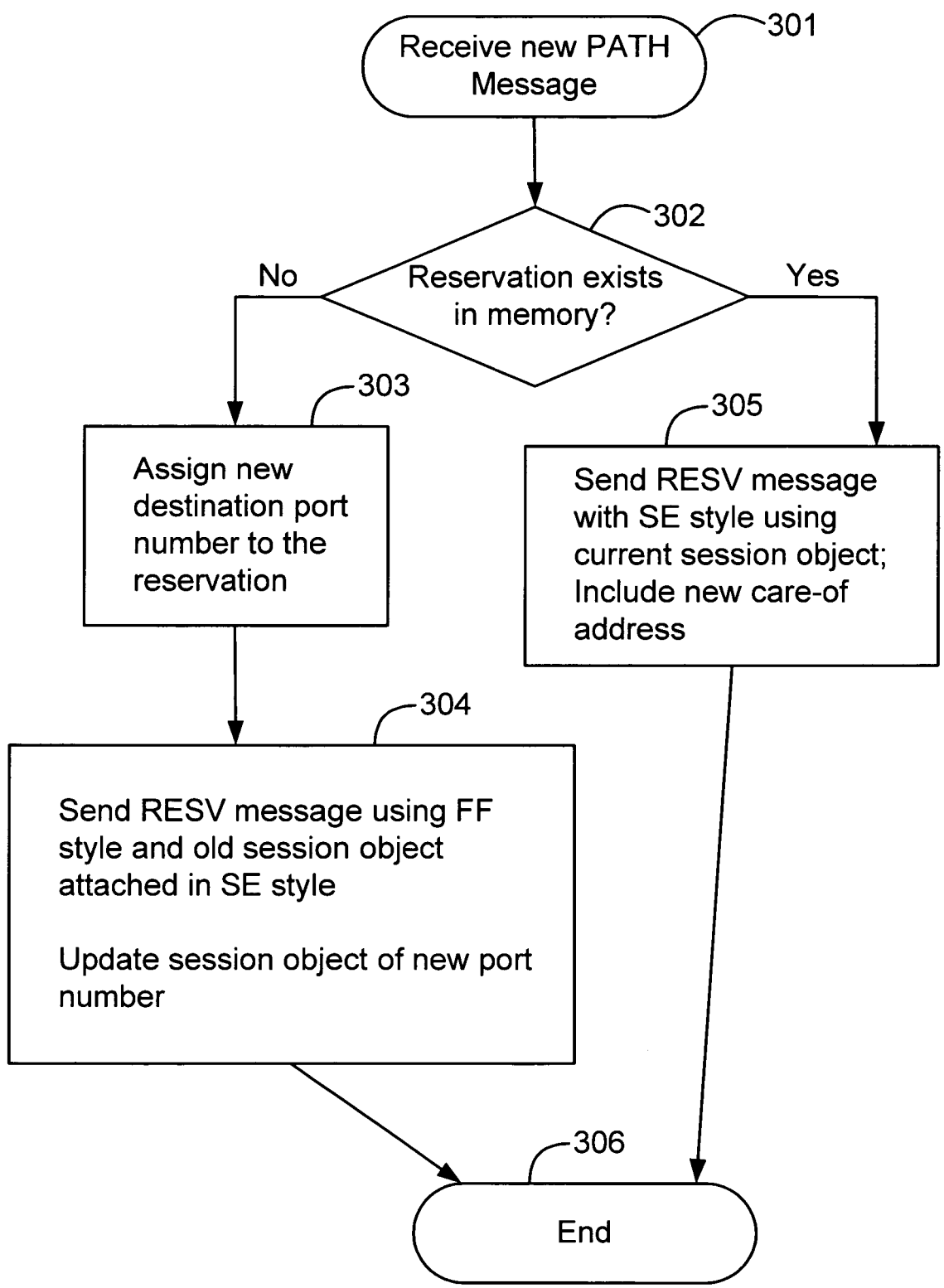
FIG. 3 is a flow chart for the operation of a home agent with a sender wireless terminal.

The detailed algorithm for the home agent 103 is shown in FIG. 3. When the home agent 103 receives new path message (PATH) 206 in block 301, it first determines whether the path message 206 is an update of a reservation of an existing wireless terminal 102, or is a reservation for a new wireless terminal 102. The default destination port of IP tunneling, as assigned by IANA, is port "363," so the reservation is for a new tunnel if the destination port is "363." In this case, the home agent 103 will assign an unused and unique port number to distinguish the tunnel for this wireless terminal 102 from other tunnels as shown in block 303.

In block 304, a new session object 202 is produced that includes the home agent 103's address, a new assigned unique destination port, and a protocol identifier of UDP. A path message 206 from the foreign agent 104 or 105 uses a session object 202 that includes the home agent 103's IP address, the default destination port "363", and a protocol identifier of UDP. The new session object 202 is attached at the end of the reservation request (RESV) message 204.

Figure 6:
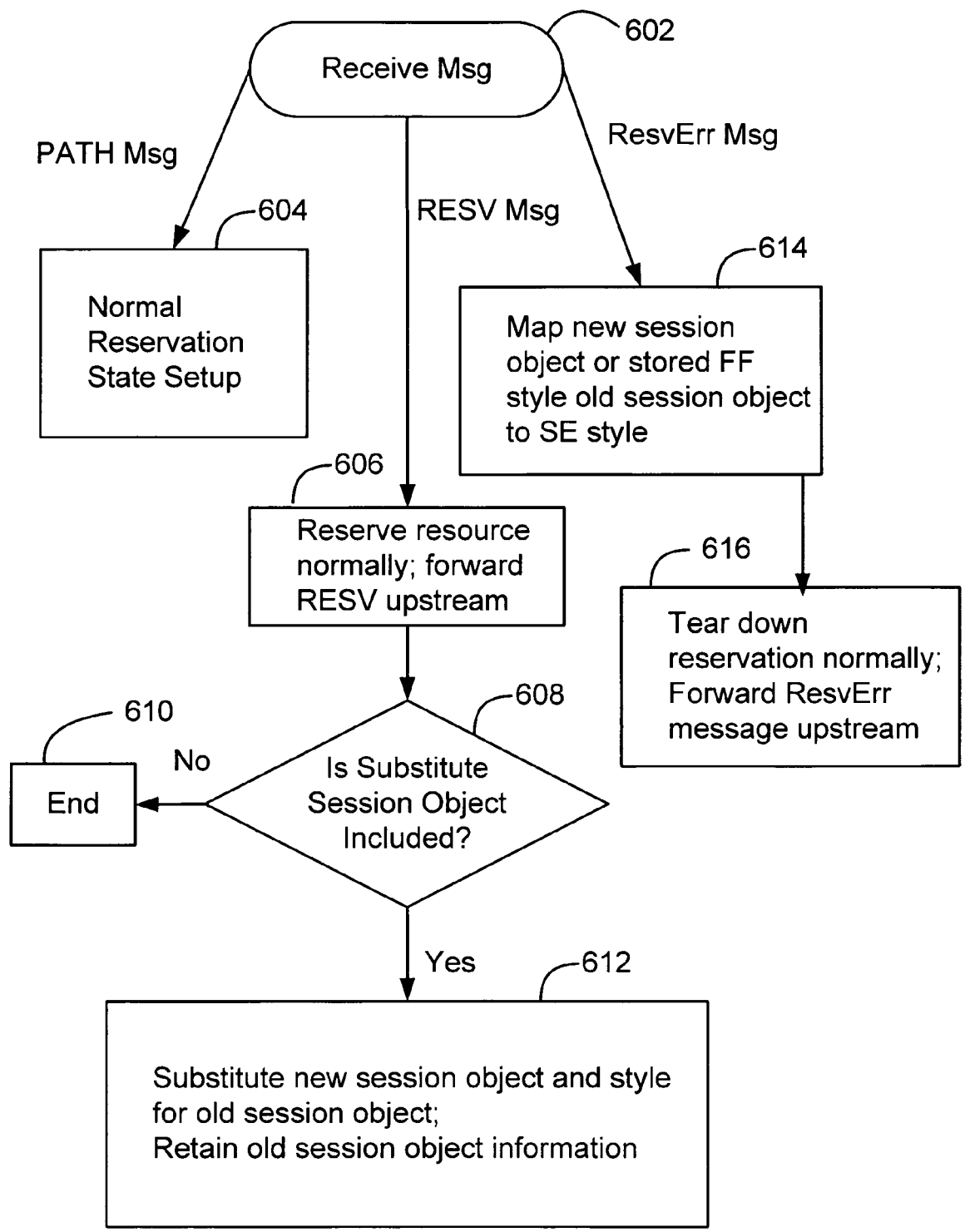
FIG. 6 is a substitution extension flow chart for routers with a sender wireless terminal.

A router 110 should have an extension to substitute the old session object 202 with the new updated session object 202. Such an extension is shown in FIG. 6. With this extension, the reservation request message 204 may travel back to the wireless terminal 102, and all of the session objects 202 in the routers 110 may be updated at the same time.

If, however, in block 302 the path message 206 is determined to be an update for an existing wireless terminal 102, then at block 305 the reservation request message 204 is produced using the existing session object 202 and the SE style. The filter spec of this reservation request message 204 is the same as the sender template of the path message 206 just received. In this case, when the intermediate router 110 receives the message 204, if the care-of address does not change and the reservation states are simply updated. Otherwise if the care-of address is the new care-of address of the new foreign agent 105, the router 110 will add the new care-of address in the sender sharing list of the reservation. Eventually, the update of old care-of address stops and the corresponding states in the intermediate router 110 will timeout. If the old care-of address is the only sender of the session on the intermediate router 110, the resource will be returned to the system. If the old care-of-address and new care-of-address co-exist on the intermediate router 110, the old care-of address will be removed from the sharing sender list of the resource. When the wireless terminal 102 registers to the new foreign agent 105, it may inform the new foreign agent 105 of its corresponding home agent 103's destination port in order for the new foreign agent 105 to produce a proper path message 206.

The FF style should be used in the initial path message 206 to set up the first tunnel between home agent 103 and the first visited foreign agent 104, because multiple tunnel sessions between the first foreign agent 104 and the home agent 103 may exist for different end-to-end sessions. If the SE style is used in the initial path message 206, these multiple sessions from different wireless terminals 102 may share reservation because each initial reservation uses the default destination port "363", which is undesirable. Where the FF style is used, such sharing will not occur, because each path message 206 for each wireless terminal 102 will have a different sender template. Subsequently, when the reservation request message 204 comes back, the style is changed from the FF style to the SE style. Because each session will be assigned a unique destination port, the undesirable sharing does not occur.

The present invention does not require the intermediate routers 110 to have an extension that supports session substitutions and updates. The wireless terminal 102 the foreign agents 104 and 105 are equipped with extensions to allow for updating the session object 202. Therefore, in the next path update interval, each foreign agent 104 and 105 will use the new session object 202 to send path messages 206, which will be treated as a new reservation by each intermediate router 110 without an extension. However, each intermediate router 110 with an extension will treat the path messages 206 with the new session object as an update. After the home agent 103 sends back the reservation request message 204, the new reservation may be set up. The old reservation, which used the old session object 202, will eventually time out in the intermediate routers 110, freeing up the resources allocated thereto.

Without more, however, the QoS is not guaranteed before a next path update. One way to guarantee the QoS is to require each foreign agent 104 and 105 to immediately resend the path message 206 using the new session object 202, and to send a tear down message using the old session object 202 after receiving the first reservation request message 204. After the wireless terminal 102 receives the destination port of the home agent 103, the QoS in the following handover is guaranteed.

Figure 4:
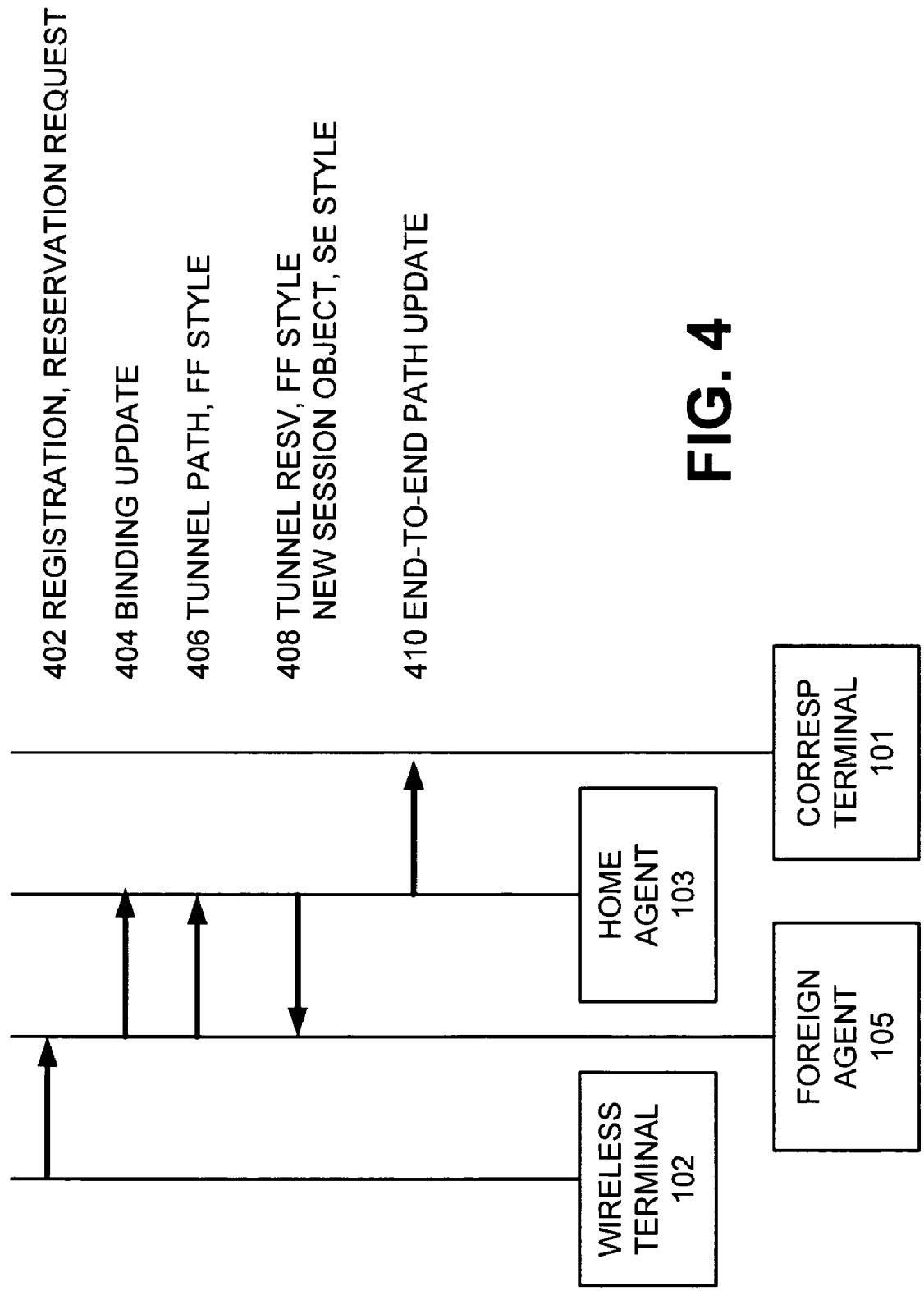
FIG. 4 is a packet communication diagram for a first handover with a sender wireless terminal.

FIG. 4 is a message flow chart for a first handover, where the wireless terminal 102 moves from the home agent 103 to the first foreign agent 104. At 402, the wireless terminal 102 registers with the foreign agent 104, and sends a path message 206 to ask the foreign agent 104 to make a reservation. The reservation may also be requested using different transportation forms, such as an extension field in a registration message. The foreign agent 104 uses the reverse tunnel 107 to send the end-to-end path message 206 to the corresponding node 101. At the same time, the foreign agent 104 maps this end-to-end traffic to its locally unique source port number and produces the tunnel path message 206 to the home agent 103.

At 404, a binding update message is sent from the foreign agent 104 to the home agent 103 indicating the first care-of address of the wireless terminal 102. At 406, a tunnel path message 206 is sent from the foreign agent 104 to the home agent 103. The tunnel path message 206 includes the foreign agent 104 address and unique source port, the protocol identifier, the home agent 103 address, the destination port "363", and the FF style.

At 408, a tunnel reservation request message 204 is sent from the home agent 103 to the foreign agent 104. The tunnel reservation request message 204 includes the FF style, the foreign agent 104 address and unique source port, the protocol identifier, the home agent 103 address, a destination port "363", a new session object 202 with a new unique destination port attached, and SE style. After the home agent 103 receives the tunneled end-to-end path message 206, at 410, the home agent 103 sends an end-to-end path update message 206 to the corresponding terminal 101.

Figure 5:
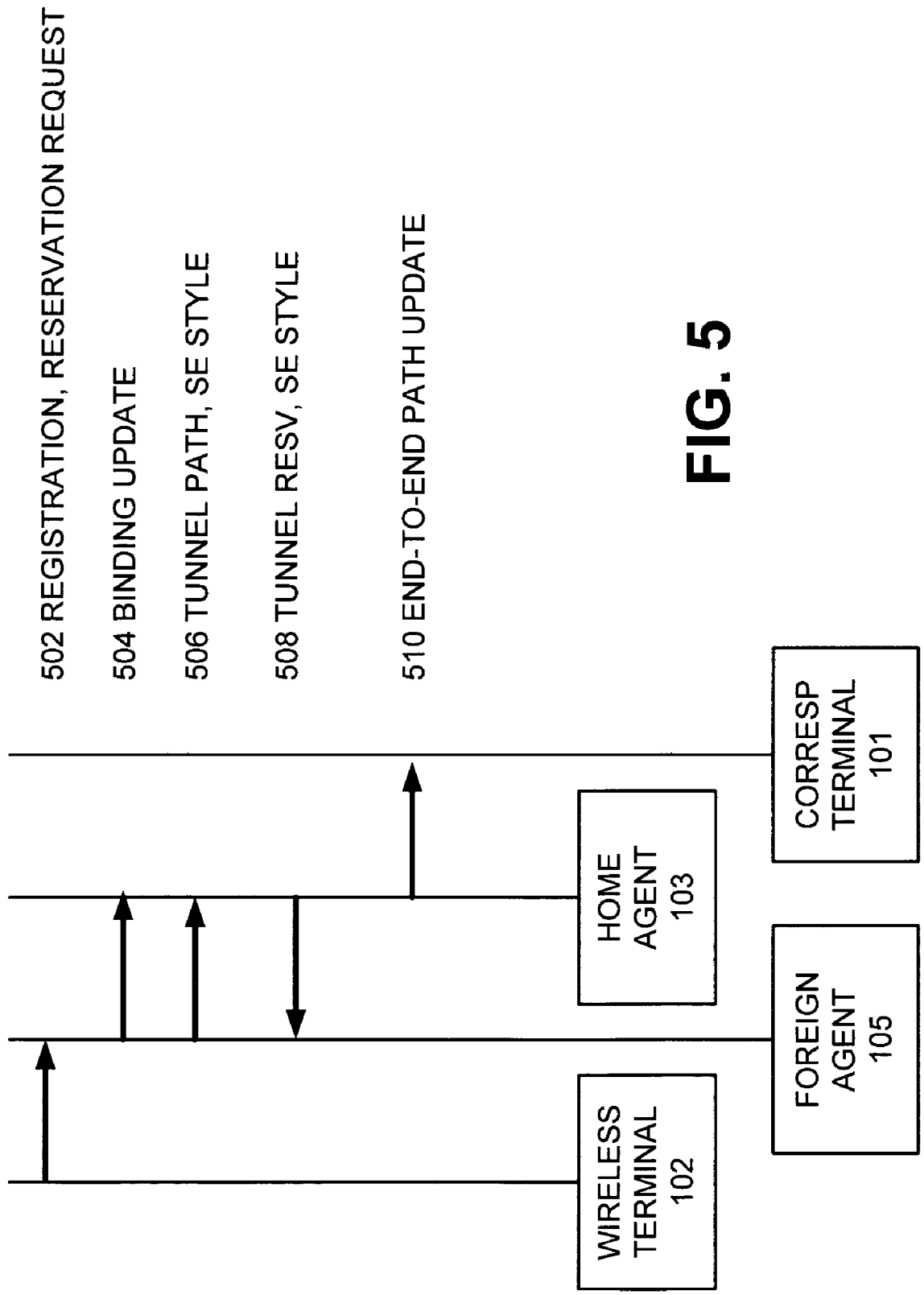
FIG. 5 is a message flow chart for a handover following a first handover with a sender wireless terminal.

A message flow chart for a handover following the first handover is shown in FIG. 5. At 502, 504, and 510 the flow is the same as in 402, 404, and 410 during the first handover. At 506, a tunnel path message 206 is sent from the foreign agent 105 to the home agent 103. The tunnel path message 206 includes the foreign agent 105 address and unique source port, the protocol identifier, the home agent 105 address and unique destination port, and the SE style.

At 508, a tunnel reservation request message 204 is sent from the home agent 103 to the foreign agent 105. The tunnel reservation request message 204 includes the foreign agent 105 address and unique source port, the protocol identifier, the home agent 105 address and unique destination port, and the SE style.

A detailed algorithm, where the wireless terminal 102 is the sender, for a substitution extension in the intermediate routers 110 is shown in FIG. 6. The intermediate routers 110 are all routers in the data path except the home agent 103 and the foreign agents 104 and 105. The substitution extension, which allows for updating the session object 202, is not required. However, without the substitution extension, each intermediate router 110 will create reservations using the old session object, which may cause a performance penalty.

At block 602, the intermediate router 110 receives a message. If the message is a path message 206, then at block 604 the intermediate router 110 enters the normal reservation state setup. If the message is a reservation request message 204, then at block 606 the intermediate router 110 reserves resources, and forwards the reservation request message 204 upstream.

Then, if at block 608 the intermediate router 110 determines that a substitute (new) session object 202 is not included in the reservation request message 204, the algorithm ends at block 610. If, however, there is a substitute session object 202 in the reservation request message 204, then at block 612 the intermediate router 110 replaces the old session object 202 with the substitute session object 202, while maintaining information relating to the old session object 202.

If the message received at block 602 is a reservation error message, then at block 614 the intermediate router 110 maps the substitute session object 202 or the old session object 202 to the SE style. Then at block 616, the intermediate router 110 tears down the reservation, and forwards the reservation error message upstream.

Resource Sharing where Wireless Terminal is Receiver

Where the wireless terminal 102 is the receiver, the home agent 103 is the sender of the downstream tunnel 106 or 108, and the foreign agent 104 or 105 is the receiver of the tunnel. The care-of-address of the wireless terminal 102 changes during a handover, from the address of foreign agent 104 to the address of foreign agent 105.

A method is provided for substituting a new session object 202 for an old session object 202, and to thereby transfer the reserved resources from the old session to the new session. A method is also provided to allow for quick release of unused resources on segment of an old tunnel that is not common with a new tunnel, and therefore cannot transferred to the new tunnel.

Figure 7:
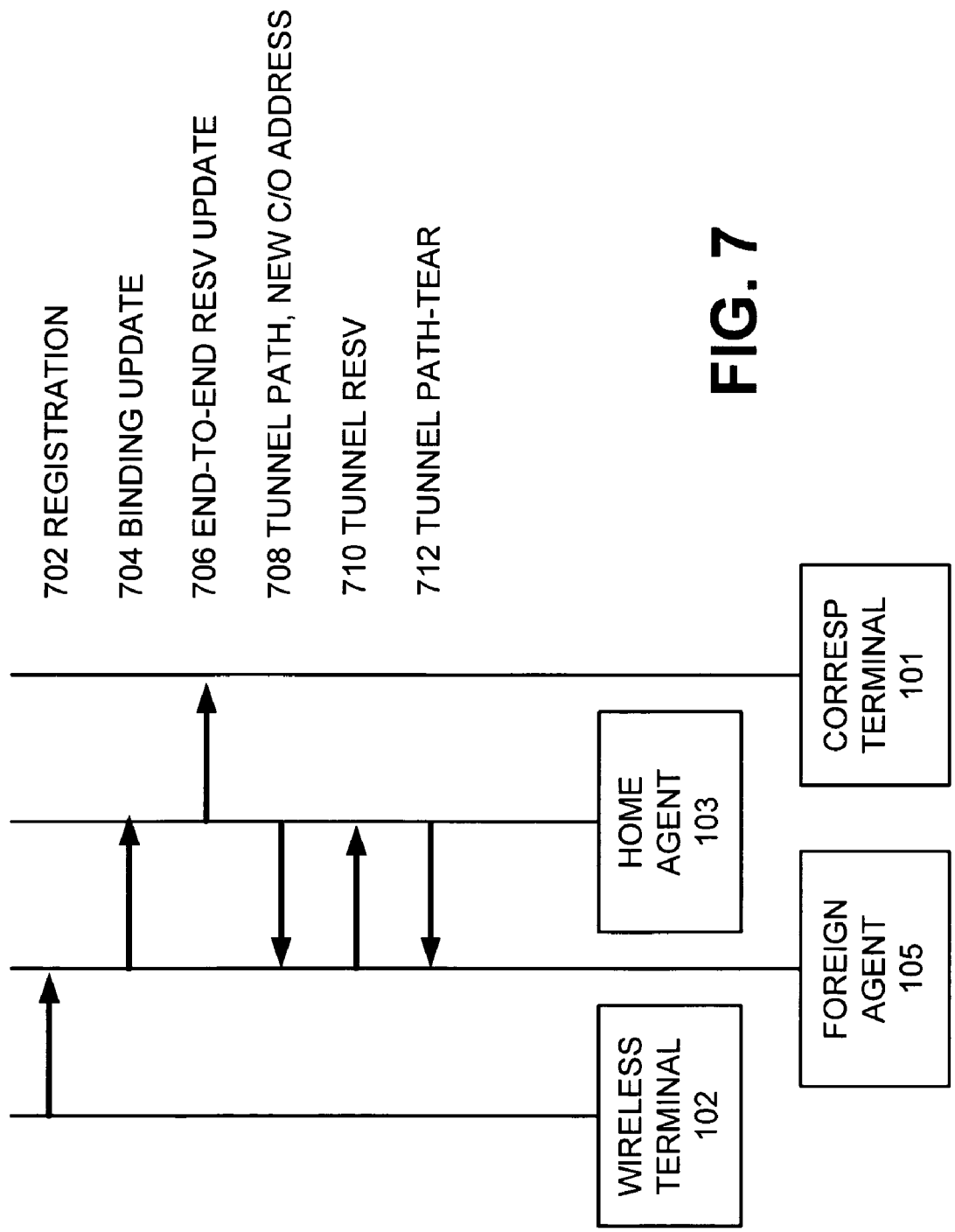
FIG. 7 is a packet communication diagram for a handover with a receiver wireless terminal.

A message flow chart for a handover where the wireless terminal 102 is the receiver is shown in FIG. 7. At 702, the wireless terminal 102 registers with the new foreign agent 105 using a registration message that includes the old reservation information, namely the five-tuples of the old downstream tunnel between home agent 103 and the old foreign agent 104. At 704, a binding update message is sent from the foreign agent 105 to the home agent 103 indicating the new address of the wireless terminal 102.

At 706, an end-to-end reservation request update message 204 is sent from the home agent 103 to the corresponding terminal 101. At 708, a tunnel path message 206 with the new care-of (C/O) address is sent from the home agent 103 to the new foreign agent 105. At 710, a tunnel reservation request message 204 for the new downstream tunnel 108 is sent from the new foreign agent 105 to the home agent 103 using the new session object 202 for substitution, with the old session object 202 attached, and the FF style. At 712, a path tear down message for the old downstream tunnel 106 with the old session object 202 is sent from the home agent 103 to the foreign agent 105.

As long as the new reservation request message 204 includes the additional old session object 202, the intermediate routers 110 with the substitution extension can assign the old reserved resource to the new session instead of reserving a new resource. This will increase the number of successful of reservations, because the old resource is always available in the common link. The common link is defined herein to be the data path and resources common to the old downstream tunnel 106 and the new downstream tunnel 108.

Because the old downstream tunnel 106 may still be in use at the time of the handover, and the new reservation may fail upstream, the transfer cannot be finalized until the new reservation succeeds. Therefore, upon receiving the reservation request message 204, each intermediate router 110 does not transfer resources from the old session to the new session immediately. Instead, each intermediate router 110 records the related new session information and waits for the reservation confirmation message from the home agent 103. After the confirmation arrives, the transformation can be finalized.

To quickly release unused resources in a part of the old downstream tunnel 106 that is not in the common link, once the reservation request message 204 reaches the home agent 103, the home agent 103 sends a path tear-down (PATH-TEAR) message to the old foreign agent 104. The path tear-down message serves two purposes. First, it releases the resources of the old downstream tunnel 106 for the routers 110 which do not carry the new downstream tunnel 108. Second, for the routers where the old downstream tunnel 106 and the new downstream tunnel 108 the path tear-down message finalizes the transfer of resources from the old downstream tunnel 106 to the new downstream tunnel 108. After the reservation is complete, new packets from the corresponding terminal 101 will use the new downstream tunnel 108, so that seamless QoS support is achieved. The detailed reservation algorithm at the intermediate routers is shown in FIG. 8.

The old session object 202 five-tuple of the reservation may be provided to the new foreign agent 105 directly by the old foreign agent 104 or by the wireless terminal 102. As an additional alternative, the old session object 202 five-tuple may be provided by the home agent 103 in the tunnel path message 206 to the new foreign agent 105 after the home agent 103 receives the binding update from the new foreign agent 105. This alternative will not introduce a time delay if it is piggybacked with the in the necessary information in the tunnel path message 206. Also, final confirmation of a successful reservation on the new downstream tunnel 108 may be expressed in other means than the path tear-down message. For example, the first packets for the new downstream tunnel 108 could be a trigger to finalize the substitution.

Figure 8:
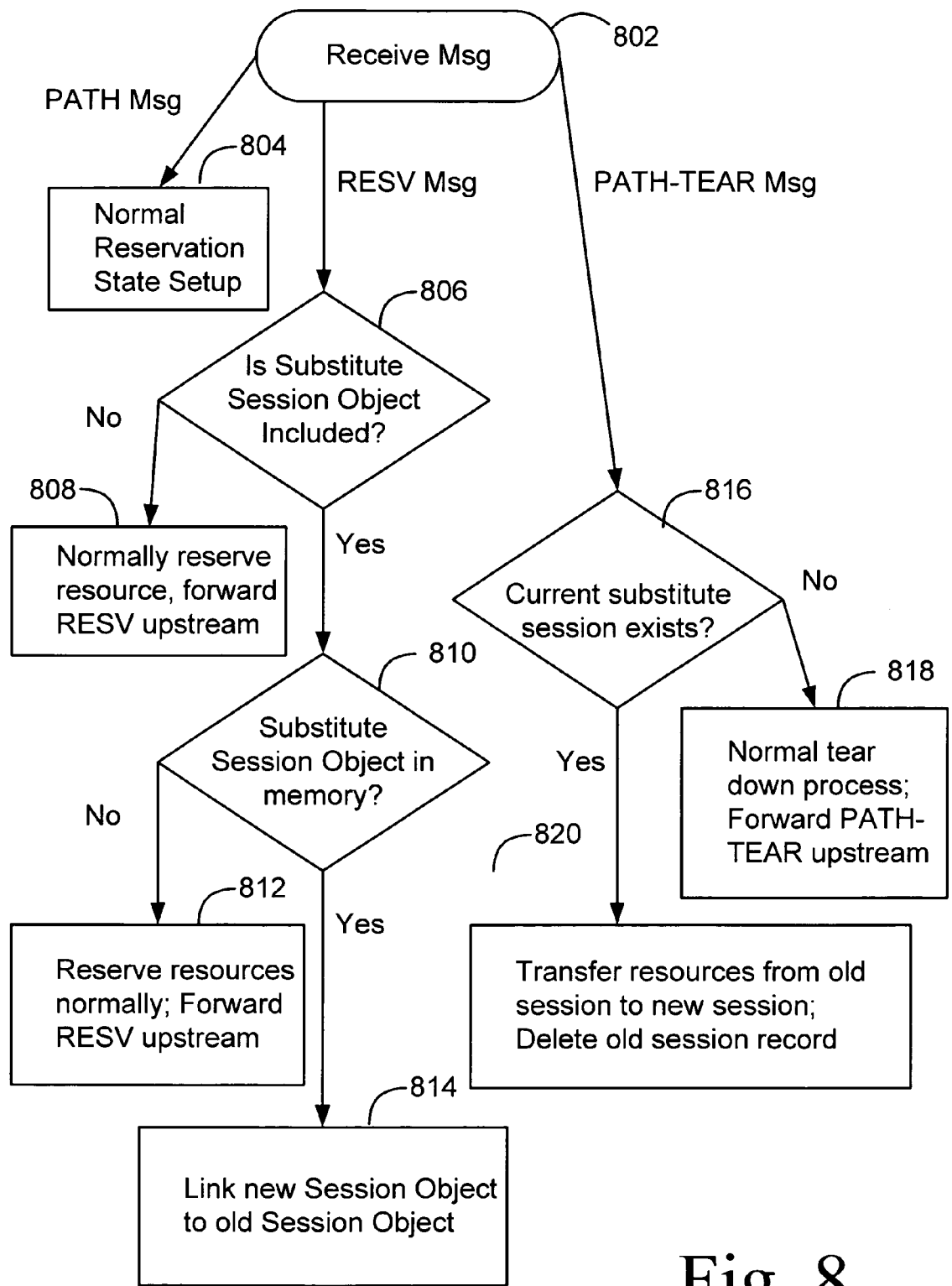
FIG. 8 is a substitution extension flow chart for routers with a receiver wireless terminal.

FIG. 8 a flow chart for a detailed reservation algorithm for a substitution extension in the intermediate routers 110; where the wireless terminal 102 is the receiver. At block 802, the intermediate router 110 receives a message. If the message is a path message 206, then at block 804 the intermediate router 110 enters the normal reservation state setup. If the message is a reservation request message 204, then at block 806 the intermediate router 110 determines whether there is a substitute (old) session object 202 included in the reservation request message 204. If not, then at block 808 the intermediate router 110 reserves resources normally, and forwards the reservation request message 204 upstream.

If a substitute session object 202 is in the reservation request message 204, then at block 810 the intermediate router 110 determines whether the substitute session object 202 exits in a memory of the intermediate router 110. If not, then at block 812 the intermediate router 110 ignores the attached substitute session object 202, reserves resources normally, and forwards the reservation request message 204 upstream. If, however, the substitute session object 202 exists in the memory, then at block 814 the intermediate router 110 records the temporary substation information by linking the new session object 202 with the existing old session object 202.

If the message received at block 202 is a path tear-down message (PATH-TEAR), then at block 816 the intermediate router 110 determines whether a substitution session currently exists. If not, then at block 818 the intermediate router 110 tears down the path normally, and forwards the path tear-down message upstream. If a substitution session does currently exist, then at block 820 the intermediate router 110 transfers the resources from the old session to the new session, and erases the old session record.

Alternative Embodiments

The embodiment described above ("original embodiment") provides for the reuse of resources between old and new reservations when the wireless terminal 102 moves as either a sender or a receiver. This embodiment may be implemented in the context of Mobile IPv4, and the reverse tunnels 107 and 109 are used for communications from foreign agents 104 and 105 to the home agent 103, respectively, when the wireless terminal 102 is a sender. The original embodiment is described above may be used in IP-IP tunneling, which is considered to be one of the most complicated implementations. In alternative embodiments, the reuse of resources between old and new reservations may be provided in Mobile IPv6 and Mobile IPv4 with route optimization, which are considered to be less complicated implementations.

In the original embodiment, the reverse tunnels 107 and 109 are described for communications between from the foreign agents 104 and 105 to the home agent 103 when the wireless terminal 102 is a sender. In alternative embodiments, reverse tunnels 107 and 109 could be used for other purposes, or could be absent altogether.

Alternative 1: Mobile IPv4 without Reverse Tunneling

In the original embodiment, when the wireless terminal 102 is a sender, the reverse tunnels 107 and 109 are used for communications from the foreign agents 104 and 105, respectively, to the home agent 103. In a first alternative embodiment, the reverse tunnels 107 and 109 may be omitted. Rather, packets may be routed directly to the corresponding terminal 101, using the address thereof. When the wireless terminal 102 is the receiver, the method of first alternative embodiment is the same as that of the original embodiment.

In the first alternative embodiment, the address of the corresponding terminal 101 is again fixed, so the destination address of the session object 202 does not change with the handover. Hence, the SE style reservation discussed earlier may be used directly with the corresponding terminal 101. The corresponding terminal 101 may duplicate all of the functionality possessed by the home agent 103 in the original embodiment. This functionality may include tunneling, unique port assignment, and session object 202 transformations.

Furthermore, if the wireless terminal 102 communicates directly with (no tunneling) the corresponding terminal 101, then the reservation request message 204 is not limited to using port number "363", as is required in EP-IP tunneling. The reservation request message 204 may use the SE style and the current unique port number. Therefore, the only functionality required in the corresponding terminal 101 is session object 202 transformations. This is because the reservation request message 204 is not limited to using port number "363" as required in IP-IP tunneling.

Figure 9:
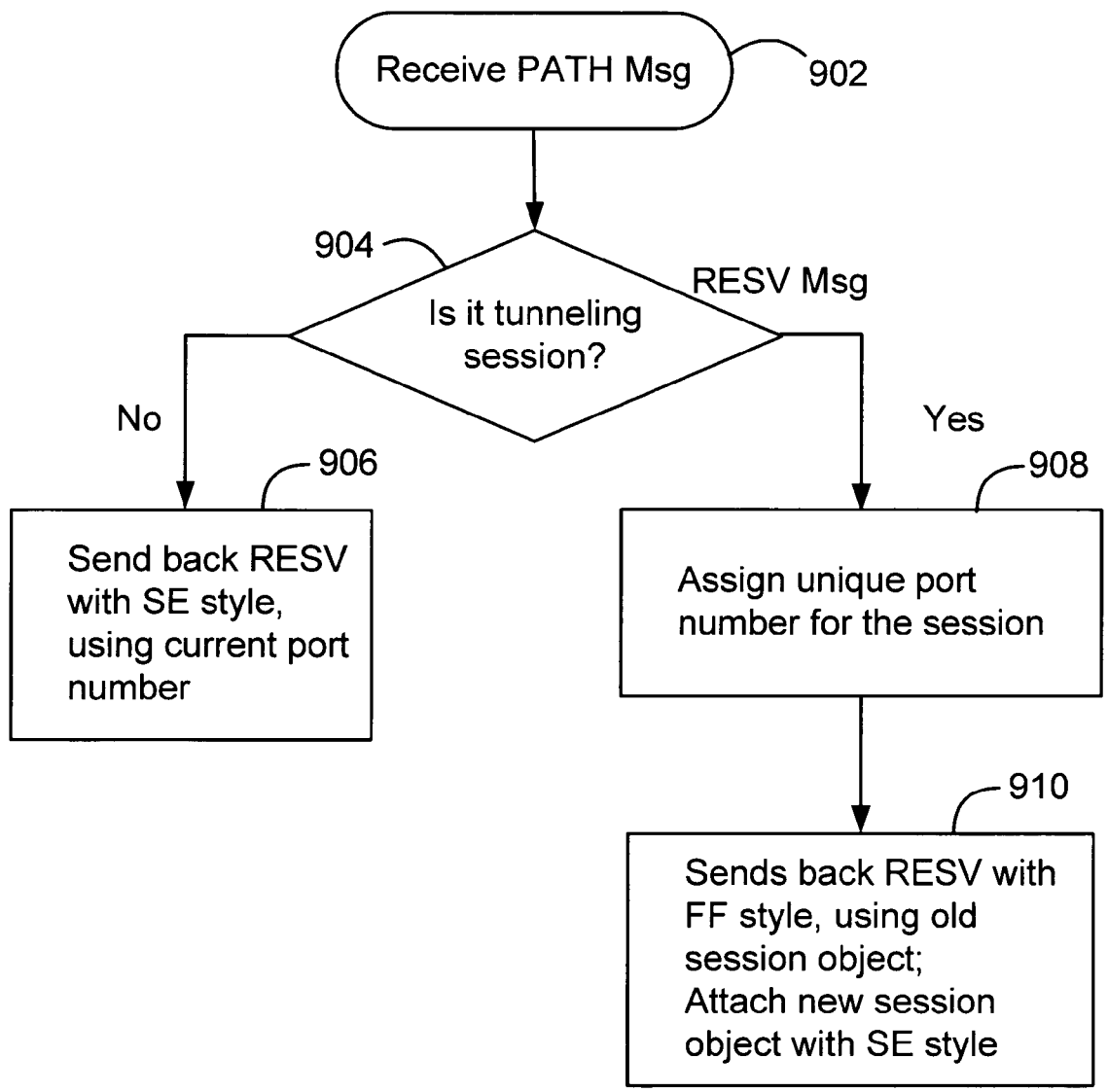
FIG. 9 is a flow chart for the operation of a corresponding terminal.

A flow chart for functionality of the corresponding terminal 101 is shown in FIG. 9. At 902, the corresponding terminal 101 receives a path message 206. If the session is not a tunneling session, then at 906 the corresponding terminal 101 responds with a reservation request message 204 using the current unique port number and the SE style. If the session is a tunneling session, then at 910, the corresponding terminal 101 assigns a unique port number for the session. At 910, the corresponding terminal 101 responds with a reservation request message 204 with the FF style using the old session object 202, and with the new session object attached with the SE style.

The main difference between the first alternative embodiment and the original embodiment is that the percentage of common path between the old data path and the new data path may be different. Unlike the first alternative embodiment, in the original embodiment the path between the home agent 103 and the corresponding terminal 101 is always common between the old data path and the new data path.

However, the advantage of the first alternative embodiment over the original embodiment is that for the unicast case, the total end-to-end path may be shorter.

The first alternative embodiment may also be useful in the multicast case, where a multicast tree is formed for multiple receiver wireless terminals 102 to share a resource. The different care-of addresses of the wireless terminals 102 are treated as multiple senders of the multicast tree, and are handled the same way as described above.

Alternative 2: Mobile IPv4 with Route Optimization

A second alternative embodiment is an extension of the first alternative embodiment. Here, the wireless terminal 102 is the receiver and the corresponding terminals 101 uses the new care-of address of the wireless terminal 102 as the destination address to send packets directly to the wireless terminal 102 without using the home agent 103. The corresponding terminal 101 behaves as the home agent 103 did in the original embodiment. The reserved resource is shared and transferred from the old session to the new session by attaching the old session object 202 to the new reservation request 204.

Alternative 3: Mobile IPv6

The main difference between mobile IPv6 and IPv4 is the disappearance of the foreign agent 104 in IPv6. The foreign agent 104 is not necessary in IPv6 because the wireless terminal 102 may obtain a care-of address without the specific foreign agent 104. Also, an IPv6 router 110 may route packets to the wireless terminal 102 by use of an IPv6 link-local address. The wireless terminal 102 may send binding update messages to both the home agent 103 and the corresponding terminal 101. Therefore, the corresponding terminal 101 and the wireless terminal 102 may communicate with each other directly, without the use of the home agent 103.

This third alternative embodiment for use with mobile IPv6 is similar to the first and second alternative embodiments discussed above. The home agent 103 may be used on both upstream and downstream, as in the original embodiment. Traffic may be routed directly from the wireless terminal 102 to the corresponding terminal 101 without reverse tunneling, as in the mobile IPv4 embodiment.

Also similar to the first alternative embodiment, in the third alternative embodiment the corresponding terminal 101 sends packets directly to the wireless terminal 102 after receiving the new binding update. Reservations in the third alternative embodiment use the session object 202 as in the first alternative embodiment, except that the address length in IPv6 is longer. Therefore, the methods described above for the first alternative embodiment may be used by merely substituting the JPv6 address for the IPv4 address.

Figure 10:
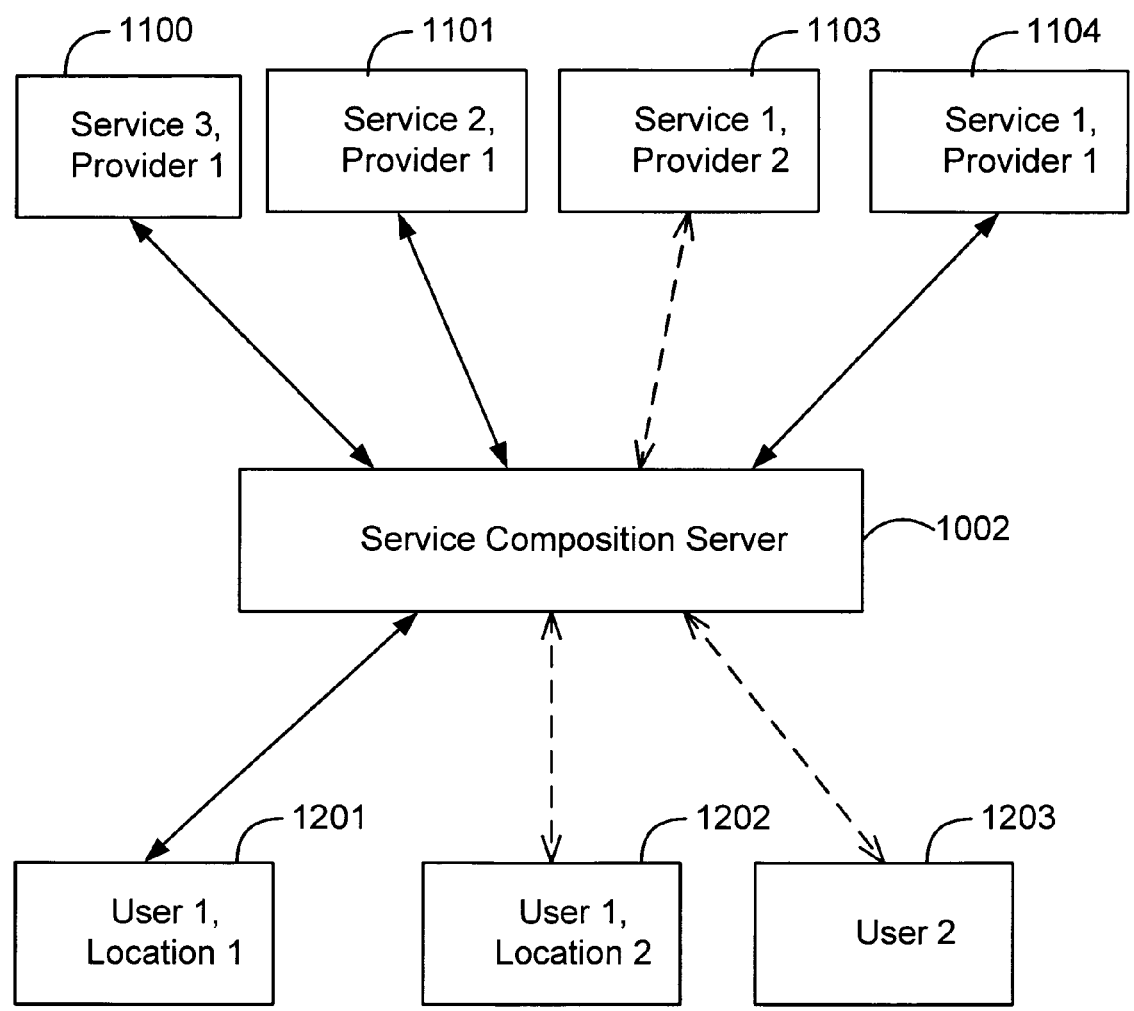
FIG. 10 is a block diagram for a network including a service composition server.

A flow label in IPv6 is the new concept that is not included in IPv4. The flow label could be used to identify a specific session. However, support of flow labels is not standardized. Therefore, the flow label needs to work together with a source IP address to uniquely identify a specific session between two nodes. Until flow label support is standardized, the third alternative embodiment should include port information and flow label information in the session object 202. In the future, the third alternative embodiment could use the flow label alone to uniquely identify a specific session between two nodes Alternative 4: Application Scenarios The methods disclosed above for resource sharing and reservation are general in nature. These methods may be used in different situations, and QoS support during mobility is just one example. Two other examples are shown in FIG. 10.

For a first example, a service composition server 1002 may integrate simplex services from different service providers 1100-1104 and provides users 1201-1203 with composite services. The traffic may be limited between the service composition server 1002 and the users 1201-1203, or between the service providers 1100-1104 and the users 1201-1203 but relayed by the service composition server 1002. The resource reservation and sharing methods described herein may be used to guarantee services to the users 1201-1203. The resource reservation and sharing could occur when one of the users 1201-1203 roams from one sub-network or access network to another. Additionally, the resource reservation and sharing could occur when the system switches from one user 1201-1203 to another user 1201-1203 according to a sharing policy. The resource reservation and sharing methods described herein could be used here to allocate resources along the path between the users 1201-1203 and the service composition server 1002.

For a second example, one simplex service may be provided by multiple service provides 1100-1104, each having different properties, such as QoS and price. The network topology is similar to the first example above, although the service composition server 1002 behaves differently. The service composition server 1002 may dynamically choose the most suitable service provider 1100-1104 for current users 1201-1203. Once again, the resource reservation and sharing methods described herein may be used to reserve the resource between the service providers 1100-1104 and service composition server 1002.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for maintaining a quality of service in a wireless communication network, comprising the steps of:
    creating a first reservation in a first data path between a corresponding terminal and a wireless terminal, where the first data path includes a segment between a home agent and a first foreign agent;
    creating a second reservation in a second data path between the corresponding terminal and the wireless terminal, where the second data path includes a segment between the home agent and a second foreign agent, and wherein the first and second data paths are distinct data paths; and
    sharing a resource between the first and second reservations on a router common to the segments of the first and second data paths.

2. The method of claim 1, where the first data path includes a second segment between the corresponding terminal and the home agent and the second data path includes a second segment between the corresponding terminal and the home agent, further including the step of sharing a resource between the first and second reservations on a router common to the second segments of the first and second data paths.

3. The method of claim 1, where the step of sharing the resource further includes the steps of creating a tunnel between the home agent and the first foreign agent.

4. The method of claim 3, where the step of creating the tunnel further includes the step of creating an IP-IP tunnel.

5. The method of claim 3, where the step of creating a first reservation further includes the step transporting end-to-end reservation messages between the wireless terminal and the corresponding terminal through the tunnel.

6. The method of claim 1, where the step of creating a first reservation further includes the step transporting end-to-end reservation messages between the wireless terminal and the corresponding terminal.

7. The method of claim 2, where the step of transporting the end-to-end reservation messages further includes the step of transporting the end-to-end reservation messages transparently from the perspective of the wireless terminal and the corresponding terminal.

8. The method of claim 1, where the step of sharing a resource further includes the step of sending a shared explicit style reservation message including an address of the first foreign agent and a sender template.

9. The method of claim 8, where the step of sending a shared explicit style reservation message further includes the step of merging a second sender template from a second shared explicit style reservation message into the sender template.

10. The method of claim 9, where the shared explicit style reservation messages are of a common session.

11. The method of claim 1, where the step of sharing a resource further includes the step of sending, from the home agent to the first foreign agent, a reservation message including a first session object associated with a first destination port and a second session object associated with a second destination port.

12. The method of claim 1, where the destination ports are tunnel destination ports.

13. The method of claim 11, further including the step of substituting, in a memory of the router, the second session object for the first session object.

14. The method of claim 11, further including the step of selecting a unique destination port as the second destination port.

15. The method of claim 1, where the first data path consists essentially of a reverse tunnel for carrying data from the first foreign agent to the home agent, and second data path consists essentially of a reverse tunnel for carrying data from the second foreign agent to the home agent.

16. The method of claim 1, further including the steps transmitting data from a wireless terminal through the first foreign agent and the home agent to the corresponding terminal, and transmitting data from the wireless terminal through the second foreign agent and the home agent to the corresponding terminal.

17. The method of claim 16, where the step of transmitting data through the first foreign agent further includes the step of associating the wireless terminal with the first foreign agent.

18. The method of claim 16, where the step of transmitting data through the second foreign agent further includes the step of associating the wireless terminal with the second foreign agent, and disassociating the wireless terminal from the first foreign agent.

19. A method for maintaining a quality of service in a wireless communication network, comprising the steps of:
creating a first reservation in a first data path between a home agent and a router using a first session object;
creating the first reservation in a second data path between the router and a first foreign agent using the first session object;
creating a second reservation in a third data path between the router and a second foreign agent using the first session object and a second session object, wherein the second and third data paths are distinct data paths; and
creating the second reservation in the first data path using the first and the second session objects, where resources in the first data path are reserved by the first and the second reservation.

20. The method of claim 19, where the step of creating a second reservation in a third data path further includes the step of sending a reservation request message including the first and the second session objects from the second foreign agent, through the router to the home agent.

21. The method of claim 20, further including the steps of storing information from the second session object in a memory of the router, receiving a path tear-down message including the first session object at the router, and substituting the information from the second session object for the first session object in the memory.

22. The method of claim 19, where the first and second data paths form a forward tunnel for carrying data from the home agent to the first foreign agent.

23. The method of claim 19, where the first and third data paths form a forward tunnel for carrying data from the home agent to the second foreign agent.

24. The method of claim 19, further including the steps transmitting data from the home agent through the first foreign agent to a wireless terminal through, and transmitting data from the home agent through the second foreign agent to the wireless terminal.

25. A method for maintaining a quality of service in a wireless communication network, comprising the steps of:
creating a first reservation in a first data path between a first terminal and a second terminal;
creating a second reservation in a second data path between the first terminal and the second terminal, wherein the first and second data paths are distinct data paths; and
sharing a resource on a router common to the first and second reservations.

26. The method of claim 25, where the first terminal sends data to the second terminal.

27. The method of claim 25, further including the steps sending, from the first terminal, a shared explicit style reservation message that includes an address of the second terminal, a sender template, and a unique destination port number.

28. The method of claim 27, where the step of sending shared explicit style reservation message further includes the step of merging a second sender template from a second shared explicit style reservation message into the sender template.

29. The method of claim 27, where the address is a care-of address of the second terminal.

30. The method of claim 29, further including the steps of forming, with the second terminal, a new care-of-address, and sending a binding update message from the second terminal to the first terminal.

31. The method of claim 30, where sending the binding update message further includes the step of sending the binding update message from the second terminal to a home agent.

32. The method of claim 26, further including the steps of sending, from the second terminal to the first terminal a binding update message, reading an address of the second terminal from the binding update message, and sending a packet to the second terminal at the address.

33. The method of claim 25, further including the step of sending, from the second terminal through the router to the first terminal, a reservation request message including a first session object including a first address and a second session object including a second address.

34. The method of claim 25, where the addresses are care-of addresses.

35. A wireless communication network, comprising:
a home agent communicatively coupled to a corresponding terminal;
a first foreign agent communicatively coupled to a wireless terminal;
a first data flow originating at the corresponding terminal and terminating at the wireless terminal;
a second data flow originating at the wireless terminal and terminating at the corresponding terminal;
a first downstream tunnel coupled to the home agent and the first foreign agent, the first downstream tunnel reserving resources to carry the first data flow from the home agent to the first foreign agent at a first quality of service;
a first reverse tunnel coupled to the home agent and the first foreign agent, the first reverse tunnel reserving resources to carry the second data flow from the first foreign agent to the home agent at a second quality of service;
a second foreign agent communicatively coupled to the wireless terminal;
a second downstream tunnel coupled to the home agent and the second foreign agent, the second downstream tunnel sharing reserved resources of the first downstream tunnel to carry the first data flow from the home agent to the second foreign agent at the first quality of service;
a second reverse tunnel coupled to the home agent and the second foreign agen, the second reverse tunnel sharing reserved resources of the first reverse tunnel to carry the second data flow from the second foreign agent to the home agent at the second quality of service, wherein the reserved resources are shared between the first and second reverse tunnels and the first and second downstream tunnels during a handover of the wireless terminal from the first foreign agent to the second foreign agent.

36. The wireless communication network of claim 35, wherein the first and second downstream tunnels comprise a first common link, and the first and second reverse tunnels comprise a second common link, wherein the first common link comprises the shared reserved resources of the first and second downstream tunnels, and wherein the second common link comprises the shared resources of the first and second reverse tunnels.

37. The wireless communication network of claim 35, further comprising a quality of service path between the first foreign agent and the second foreign agent, wherein the quality of service path is configured to facilitate use of the first downstream tunnel and the first reverse tunnel for end-to-end communications between the wireless terminal and the corresponding terminal to achieve the first and second quality of services until the second downstream tunnel and the second reverse tunnel are operational.

\* \* \* \* \*